Patented Feb. 12, 1946

2,394,615

UNITED STATES PATENT OFFICE 2,394,615

METHOD OF OBTAINING STEROL AND THE LIKE FROM TALL OIL

John D. Jenkins, Milwaukee, Wis., assignor to Pittsburgh Plate Glass Company, Allegheny County, Pa., a corporation of Pennsylvania No Drawing. Application December 19, 1941, Serial No. 423,625

3 Claims. (Cl. 260—97.5)

The present invention relates to processes of obtaining sterols, such as are employed as intermediates in the preparation of pharmaceuticals of the nature of vitamins and hormones, and it has particular relation to the separation of these sterols from tall oil.

One object of the invention is to provide a method whereby highly valuable sterols may be obtained easily and economically from a material which has heretofore been regarded as being of but little value.

This and other objects of the invention will be apparent from consideration of the following specification and the appended claims.

In the manufacture of paper pulp by the sulfite process, an oily material termed "tall oil" is liberated and may be collected. The amount obtained constitutes several thousand tons annually. The material consists primarily of

|  | Per cent |
|---|---|
| Fatty acids | 50 to 60 |
| Resin acids | 34 to 48 |
| Non-acids | 6 to 10 |

Heretofore tall oil has enjoyed but little commercial application probably because it was difficult or impossible to obtain satisfactory separation of the mixture composing it into the components suitable for commercial purposes. It has now been recognized that the non-acid component of tall oil contains substantial amounts of sterols of the nature of those materials employed in the preparation of such pharmaceuticals as vitamins and hormones. Some of these sterols when obtained in sufficiently pure form are of great commercial value and are relatively difficult to obtain in sufficient quantities to supply the demand.

The present invention contemplates the provision of a process whereby the unsaponifiable fraction including the sterols may be separated from the acid components of the tall oil and then further treated to remove the sterols from the other non-acid components. As one step, the process involves treatment of the non-acid mixture including the sterols with an anhydride of a dicarboxylic acid in such manner as to form so-called half esters, i. e., esters in which a single carboxylic group of the dicarboxylic acid is esterified while the other is left free. By suitable saponification with alkali the half ester is rendered water soluble so that by subsequent extraction the non-esterifiable component can be eliminated from the half ester. The ester can then be hydrolyzed to liberate the free sterols.

In the practice of the invention a tall oil, which may be approximately of the composition above described, is treated with an alkali, such as sodium or potassium hydroxide, preferably in solution in water, in order to form water soluble soaps of the acids. The amount of alkali employed preferably is approximately sufficient to neutralize the free acids, which point can be determined by appropriate titrated methods well understood in the chemical art. The unsaponifiable material is extracted from the water solution with a solvent which is insoluble in water or the soap solutions thereof. Convenient solvents for the purpose include the ethers, such as diethyl ether or benzene, toluene and the like. The solutions will form liquid layers at room temperature that can be separated. The soaps can be acidulated to liberate the free acids which can be separated into resin acid and fatty acid components and used for such purposes as soap manufacture, resin manufacture, etc.

The solution of non-acids thus obtained is preferably evaporated in order partially or completely to eliminate the solvent and the recovered residue is treated with an anhydride of a dibasic acid, such as succinic acid, phthalic acid or the like, in a mutual solvent, such as ether, benzene, etc., for both the acid and the unsaponifiable component of the tall oil. In this way half esters of the dicarboxylic acid and the sterol component of the non-acids is obtained. Any excess of dibasic acid anhydride may be hydrolyzed by boiling the mixture with water. Subsequently the mixture is treated with sufficient alkali such as sodium hydroxide or potassium hydroxide to form salts of any free dicarboxylic acid groups present, which salts, being soluble, are in water solution. The water solution is then extracted with ether, benzene or the like solvent for the non-acid components. The solvent of course should be insoluble in water or the water solution of half esters. After removal of the non-acids the water solution remaining is treated with an excess caustic and boiled in order to hydrolyze the sterol-basic acid esters. The resultant solution is cooled and the free sterol is removed, e. g., by extraction with ether. The sterols are then obtained from the ether solution by evaporation methods well understood in the art.

If desired, the non-acid fraction comprising the sterols may preliminarily be obtained in relatively concentrated form by extraction methods. One convenient method involves subjecting tall oil while dissolved in an excess of a polar solvent, such as a mixture of furfural saturated with water or monomethyl ether of ethylene glycol containing 8 to 12 per cent water to extraction with a hydrocarbon solvent, such as naphtha. The naphtha preferably should not substantially exceed in amount the tall oil, which is to be extracted at a ratio of about 4 to 8 parts of naphtha to 10 parts of tall oil, which is satisfactory. The aqueous solvent medium employed preferably will be in a ratio of about 8 to 12 times in volume that of the tall oil treated. The extraction may be conducted countercurrently whereby a raffinate fraction containing a high concentration of non-acid components together with a considerably enriched preparation of free fatty acids is obtained. If desired the raffinate fraction may be further extracted with additional substantially pure aqueous solvent. The raffinate can then be subjected to treatment to recover the sterols contained therein in accordance with the foregoing procedure. It will be apparent that if the non-acids are thus obtained in concentrated form the volume of material required to be treated in order to obtain the sterols is substantially reduced.

It will also be apparent that the tall oil may first be admixed with a solvent for the non-acid components, e. g., naphtha and the solution may then be extracted with an excess of aqueous polar solvent, such as furfural or monomethyl ether of ethylene glycol. A raffinate rich in non-acids results and can be treated for recovery of the sterol content.

Crystallization methods whereby resin acid content of tall oil may be partially or completely crystallized from other components are also contemplated as being within the spirit of the invention. The fraction containing the fatty acids can then be treated for removal of sterol.

The forms of the invention herein described are to be considered merely as exemplary. It will be apparent to those skilled in the art that numerous modifications may be made therein without departure from the spirit of the invention or the scope of the appended claims.

What I claim is:

1. A process of recovering sterol from tall oil which process comprises removing the acid components from the non-acid components of tall oil, then treating the non-acid component with an anhydride of a dicarboxylic acid in a solvent selected from the class consisting of benzene and ether to react said anhydride with the sterol content of the non-acid component whereby to form a half ester of the sterol content of the non-acid components of tall oil, neutralizing the half ester with a water solution of an alkali, extracting off the non-esterifiable components from the water solution with a solvent selected from the class consisting of ether and benzene, boiling the water solution with an excess of caustic in order to hydrolize the sterol-dibasic acid half esters and extracting the free sterols from the solution with ether.

2. A process as defined in claim 1 in which the dicarboxylic acid anhydride employed is phthalic anhydride.

3. A process as defined in claim 1 in which the dicarboxylic acid anhydride employed is succinic acid anhydride.

JOHN D. JENKINS.